United States Patent [19]
Pradel

[11] Patent Number: 5,769,401
[45] Date of Patent: Jun. 23, 1998

[54] SHIPPING SAFETY DEVICE FOR A PNEUMATIC SPRING

[75] Inventor: Robert Pradel, Heidenfeld, Germany

[73] Assignee: Fichtel & Sachs AG, Schweinfurt, Germany

[21] Appl. No.: 612,552

[22] Filed: Mar. 8, 1996

[30] Foreign Application Priority Data

Mar. 11, 1995 [DE] Germany ................. 195 08 852.2

[51] Int. Cl.[6] ........................................ F16F 5/00
[52] U.S. Cl. .................. 267/64.26; 206/335; 206/446
[58] Field of Search ................. 267/64.26, 64.27, 267/64.28, 64.24, 64.11, 122, 64.12; 188/298, 322.12, 300; 206/335, 446, 516

[56] References Cited

U.S. PATENT DOCUMENTS

| | | | |
|---|---|---|---|
| 4,723,765 | 2/1988 | Pearson | 267/64.12 |
| 5,480,129 | 1/1996 | Golsdorf et al. | 188/322.12 X |
| 5,636,831 | 6/1997 | Gubitz | 267/64.24 |

FOREIGN PATENT DOCUMENTS

| | | |
|---|---|---|
| 0133347 | 2/1985 | European Pat. Off. . |
| 0142705 | 5/1985 | European Pat. Off. . |
| 2103152 | 7/1972 | Germany . |
| 3038013 | 4/1981 | Germany . |
| 3417069 | 11/1985 | Germany . |
| 3537520 | 4/1987 | Germany . |
| 3638892 | 5/1987 | Germany . |
| 4219089 | 12/1993 | Germany . |
| 1043972 | 9/1966 | United Kingdom . |

Primary Examiner—Robert J. Oberleitner
Assistant Examiner—Pamela J. Lipka
Attorney, Agent, or Firm—Nils H. Ljungman and Associates

[57] ABSTRACT

A shock absorber with a pneumatic spring, comprising an outer suspension tube and an inner suspension tube of a suspension unit, whereby elastic roller bellows are connected to the outer and inner suspension tubes, forming a spring chamber. The roller bellows are crimped on one end to the inner suspension tube. When the shock absorber with a pneumatic spring is fully assembled, a safety device is located on the pneumatic spring which centers the outer suspension tube in relation to the inner suspension tube, so that contact between the crimped part and the adjacent roller bellows is prevented, thereby preventing damage to the roller bellows.

19 Claims, 6 Drawing Sheets

SHIPPING SAFETY DEVICE FOR A PNEUMATIC SPRING

BACKGROUND OF THE INVENTION

1. Field of the Invention

This invention relates to a pneumatic suspension unit for a vehicle. The pneumatic suspension unit has an inner suspension tube and an outer suspension tube, and an elastic roller bellows is connected to the inner suspension tube and the outer suspension tube which all together form a pneumatic spring chamber.

2. Background Information

A similar known pneumatic spring is described, for example, in German Laid Open Patent Application No. 21 03 152. Unexpectedly, the roller bellows of the pneumatic spring turn out to be a relatively sensitive component, in particular when there is no overpressure in the pneumatic spring or suspension chamber of the roller bellows. During transport or subsequent handling during assembly and installation, when the roller bellows are unpressurized, the opposite facing inner sides of the roller bellows can come into frictional contact with one another, which leads to a premature destruction of the roller bellows and thus of the overall pneumatic suspension unit. The problem described above can be solved very easily by filling the pneumatic spring with compressed air immediately after the assembly of the roller bellows. As a result of this measure, the roller bellows always assume their maximum expansion, which means that no contact can occur with the crimped part of the roller bellows. But there are disadvantages involved in the use of the method described above. For one thing, there must be a minimum pressure valve on the pneumatic spring so that the overpressure is constantly maintained. This minimum pressure valve prevents the pressure from dropping below a defined level. But as a result of the pressure which is always present inside the pneumatic spring, the pneumatic spring is always at least partly extended. The disadvantage resulting from this characteristic for the manufacturer of the pneumatic spring is that the packing material must always be longer, or else fewer pneumatic springs can be placed in a single shipping unit. That is, the pneumatic suspension units are longer as a result of the pressurization, and therefore the pneumatic suspension units take more space when being packaged and shipped.

OBJECT OF THE INVENTION

The object of this invention is to realize a pneumatic spring in which the roller bellows are protected against damage, whereby the time, effort and expense required to accomplish this object are less than for the minimum pressure valve described in the relevant known publications.

SUMMARY OF THE INVENTION

The invention teaches that this object can be accomplished if, when the roller bellows have been completely assembled, a shipping safety device is located on the pneumatic spring which centers the outer suspension tube with respect to the inner suspension tube, so that contact between a crimped part and the part of the roller bellows enveloping this crimped part is prevented. The shipping safety device makes it unnecessary for the manufacturer of the pneumatic spring to pressurize it before shipping, and the minimum pressure valve also becomes unnecessary. In comparison to the known methods of preventing damage to a pneumatic suspension unit during shipping, the cost of the shipping safety device is negligible, which results in significant savings in terms of cost and the assembly time required.

In other words, the roller bellows is connected to both the inner suspension tube and the outer suspension tube, thereby forming the pneumatic spring chamber. So that the roller bellows can be attached to the inner suspension tube, a belt shaped tension element is crimped around the roller bellows so that the roller bellows is held to the inner suspension tube by the belt shaped tension band. If the inner suspension tube is permitted to move freely relative to the outer suspension tube, the end of the inner suspension tube that is crimped will move towards the outer suspension tube and will pinch the roller bellows between the end of the inner suspension tube and the outer suspension tube. This pinching action will damage the roller bellows.

According to one advantageous characteristic, the shipping safety device consists essentially of a ring-shaped circular spacer which at least partly surrounds the inner suspension tube. The degree of freedom of the inner suspension tube is severely restricted because, beyond a defined radial displacement of the inner suspension tube, the spacer becomes engaged with a component which corresponds to the roller bellows.

In other words, the shipping safety device surrounds the inner suspension tube, but at the same time the shipping safety device is positioned between the inner suspension tube and the outer suspension tube, thereby preventing radial movement between the inner suspension tube and the outer suspension tube. By eliminating the play between the inner suspension tube and the outer suspension tube, the end of the inner suspension tube does contact and damage the roller bellows.

For ease of assembly, but also for the removal of the shipping safety device, the spacer has a cross-slot or crosscut, as a result of which the spacer for the inner suspension tube can be expanded. The ends opposite or facing one another can be offset during the assembly, so that the spacer can be snapped onto the inner suspension tube.

That is, the shipping safety device is ring-shaped, so the shipping safety device can surround the inner suspension tube. So that the shipping safety device can be placed on the inner suspension tube, the ring-shaped portion of the shipping safety device has a cut or separation which forms an opening in the ring-shaped portion and which allows the shipping safety device to be placed around the inner suspension tube.

There are also guide webs which are located on the inside diameter or circumference of the spacer. As a result of this advantageous measure, the quality of the guidance provided by the spacer is improved without increasing the wall thickness. There are corresponding guide webs on the outside diameter of the spacer.

The ring-shaped shipping safety device defines an inner diameter and an outer diameter. The inner diameter corresponds to the outer diameter of the inner suspension tube, which inner suspension tube the shipping safety device surrounds. A set of inner guide webs are part of the shipping safety device and are located along the inner diameter of the ring-shaped spacer, so that the inner guide webs are adjacent the length of the inner suspension tube. The outer diameter of the shipping safety device corresponds to the inner diameter of the outer suspension tube. A set of outer guide webs are part of the shipping safety device and are located along the outer diameter of the ring-shaped spacer, so that the outer guide webs are adjacent the inner surface of the outer suspension tube. The guide webs are relatively thin and allow the ring-shaped spacer to be constructed of thin material. Thus, a material with a thickness similar to the distance between the inner suspension tube and the outer suspension tube is not needed.

So that the shipping safety device itself can be handled easily, the spacer has a handle. The shipping safety device can be used like any other conventional tool.

Modern pneumatic springs frequently have connecting lines for valves, sensors and many other different devices. To hold these lines, the handle has a number of retaining eyelets into which the lines can be introduced when the pneumatic spring is packed and transported.

The invention teaches that it is possible to achieve a significant cost advantage if the shipping safety device is made of packing material. Simple cardboard which is stiffened by a corresponding folding with guide webs and the handle meets the requirements.

One feature of the invention resides broadly in a pneumatic-spring shock-absorber assembly comprising: cylinder device; device for connecting the cylinder device to a first portion of a vehicle; piston device, the piston device being slidably mounted inside the cylinder device; the piston device dividing the cylinder device into two working chambers; piston rod device being connected to the piston to move with the piston; device for connecting the piston rod to a second portion of a vehicle; a pneumatic-spring chamber, the pneumatic spring chamber comprising: an elastic roller bellows, the elastic roller bellows comprising: a first end; a second end; and a portion between the first end and the second end; an inner suspension tube; the inner suspension tube having a longitudinal axis; device for connecting the bellows first end to the inner suspension tube; an outer suspension tube; the outer suspension tube having a longitudinal axis; device for connecting the outer suspension tube to the bellows second end; the pneumatic-spring chamber comprising an inside surface for containing a gas within the pneumatic-spring chamber; the pneumatic-spring chamber comprising an outside surface, the outside surface being disposed opposite the inside surface; the first end of the elastic roller bellows being movable with respect to the bellows between portion; mechanical device for limiting movement between the first end of the elastic roller bellows and the bellows between portion; the first end of the elastic roller bellows being movable to make contact with the bellows between portion during shipping, in absence of the mechanical device for limiting movement; the mechanical device for limiting movement for minimizing contact between the first end of the elastic roller bellows and the bellows between portion; the device for limiting movement being removably disposed adjacent to the pneumatic-spring chamber; the device for limiting movement being removably disposed adjacent to the outside surface of the pneumatic-spring chamber; the mechanical device for limiting movement comprising mechanical device for occupying a space, the space being disposed between the inner suspension tube and the outer suspension tube; and the mechanical device for limiting movement for limiting movement in a direction which is substantially transverse to the longitudinal axes of both the inner suspension tube and the outer suspension tube.

Another feature of the invention resides broadly in a pneumatic-spring shock-absorber shipping assembly, the shipping assembly for being used prior to installation of the shipping assembly in a motor vehicle to reduce damage to the roller bellows during shipping, the shipping assembly comprising: cylinder device; device for connecting the cylinder device to a first portion of a vehicle; piston device, the piston device being slidably mounted inside the cylinder device; the piston device dividing the cylinder device into two working chambers; piston rod device being connected to the piston to move with the piston; device for connecting the piston rod device to a second portion of a vehicle; a pneumatic-spring chamber, the pneumatic-spring chamber comprising: an elastic roller bellows, the elastic roller bellows comprising: a first end; a second end; and a portion between the first end and the second end; device for connecting the bellows first end to the first portion of a vehicle; and device for connecting the bellows second end to the second portion of a vehicle; the pneumatic-spring chamber comprising an inside surface for containing a gas within the pneumatic-spring chamber; the pneumatic-spring chamber comprising an outside surface, the outside surface being disposed opposite the inside surface; the first end of the elastic roller bellows being movable with respect to the bellows between portion; mechanical device for limiting movement between the first end of the elastic roller bellows and the bellows between portion; the first end of the elastic roller bellows being movable to make contact with the bellows between portion during shipping, in absence of the mechanical device for limiting movement; the mechanical device for limiting movement for minimizing contact between the first end of the elastic roller bellows and the bellows between portion; the mechanical device for limiting movement being removably disposed adjacent to the pneumatic-spring chamber; the mechanical device for limiting movement being removably disposed adjacent to the outside surface of the pneumatic-spring chamber; and the mechanical device for limiting movement comprising mechanical device for occupying a space, the space being disposed between the bellows first end connecting device and the bellows second end connecting device.

Yet another feature of the invention resides broadly in a method for shipping a pneumatic-spring shock-absorber assembly, wherein the pneumatic-spring shock-absorber assembly for shipping comprises: cylinder device; device for connecting the cylinder device to a first portion of a vehicle; piston device, the piston device being slidably mounted inside the cylinder device; the piston device dividing the cylinder device into two working chambers; piston rod device being connected to the piston to move with the piston; device for connecting the piston rod device to a second portion of a vehicle; a pneumatic-spring chamber, the pneumatic-spring chamber comprising: an elastic roller bellows, the elastic roller bellows comprising: a first end; a second end; and a portion between the first end and the second end; device for connecting the bellows first end to the first portion of a vehicle; and device for connecting the bellows second end to the second portion of a vehicle; the pneumatic-spring chamber comprising an inside surface for containing a gas within the pneumatic-spring chamber; the pneumatic-spring chamber comprising an outside surface, the outside surface being disposed opposite the inside surface; the first end of the elastic roller bellows being movable with respect to the bellows between portion; mechanical device for limiting movement between the first end of the elastic roller bellows and the bellows between portion; the first end of the elastic roller bellows being movable to make contact with the bellows between portion during shipping, in absence of the mechanical device for limiting movement; the mechanical device for limiting movement for minimizing contact between the first end of the elastic roller bellows and the bellows between portion; the mechanical device for limiting movement being removably disposed adjacent to the pneumatic-spring chamber; the mechanical device for limiting movement being removably disposed adjacent to the outside surface of the pneumatic-spring chamber; and the mechanical device for limiting movement comprising mechanical device occupying a space, the space being disposed between the bellows first end connecting device and the bellows second end connecting device; the method comprising the steps of: providing cylinder device; providing device for connecting the cylinder device to a first portion of a vehicle; providing piston device, the piston device for being slidably mounted inside the cylinder device; the piston device for dividing the cylinder device into two working chambers; providing piston rod device for being connected to the piston to move with the piston; providing device for connecting the piston rod to a second portion of a vehicle; providing a pneumatic-spring chamber, the pneumatic spring chamber comprising: an elastic roller bellows, the elastic roller bellows comprising: a first end; a second end; and a portion between the first end and the second end; device for connecting the bellows first end to the first portion of a vehicle; and device for connecting the bellows second end to the second portion of a vehicle; the pneumatic-spring chamber comprising an inside surface for containing a gas within the pneumatic-spring chamber; the pneumatic-spring chamber comprising an outside surface, the outside surface being disposed opposite the inside surface; the first end of the elastic roller bellows being movable with respect to the bellows between portion; providing mechanical device for limiting movement between the first end of the elastic roller bellows and the bellows between portion; the first end of the elastic roller bellows being movable to make contact with the bellows between portion during shipping, in absence of the mechanical device for limiting movement; the. mechanical device for limiting movement for minimizing contact between the first end of the elastic roller bellows and the bellows between portion; the mechanical device for limiting movement being removably disposed adjacent to the pneumatic-spring chamber; the mechanical device for limiting movement being removably disposed adjacent to the outside surface of the pneumatic-spring chamber; and the mechanical device for limiting movement comprising mechanical device for occupying a space, the space being disposed between the bellows first end connecting device and the bellows second end connecting device; the method comprising the further steps of: assembling the cylinder device; the device for connecting the cylinder device to a first portion of a vehicle; the piston device so that the piston device divides the cylinder device into two working chambers; the piston rod device by connecting the piston rod device to the piston for moving with the piston; the device for connecting the piston rod device to a second portion of a vehicle; the pneumatic-spring chamber; inserting the mechanical device for limiting movement in the assembled pneumatic-spring shock-absorber assembly by positioning the mechanical device in the space; packing the pneumatic-spring shock-absorber assembly in a shipping container; shipping the pneumatic-spring shock-absorber assembly; unpacking the pneumatic-spring shock-absorber assembly; installing the pneumatic-spring shock-absorber assembly on a vehicle; and removing the mechanical device for limiting movement from the pneumatic-spring shock-absorber assembly.

BRIEF DESCRIPTION OF THE DRAWINGS

The invention is explained in greater detail below with reference to the embodiments illustrated in the accompanying drawings.

DESCRIPTION OF THE PREFERRED EMBODIMENTS

Figure 1:
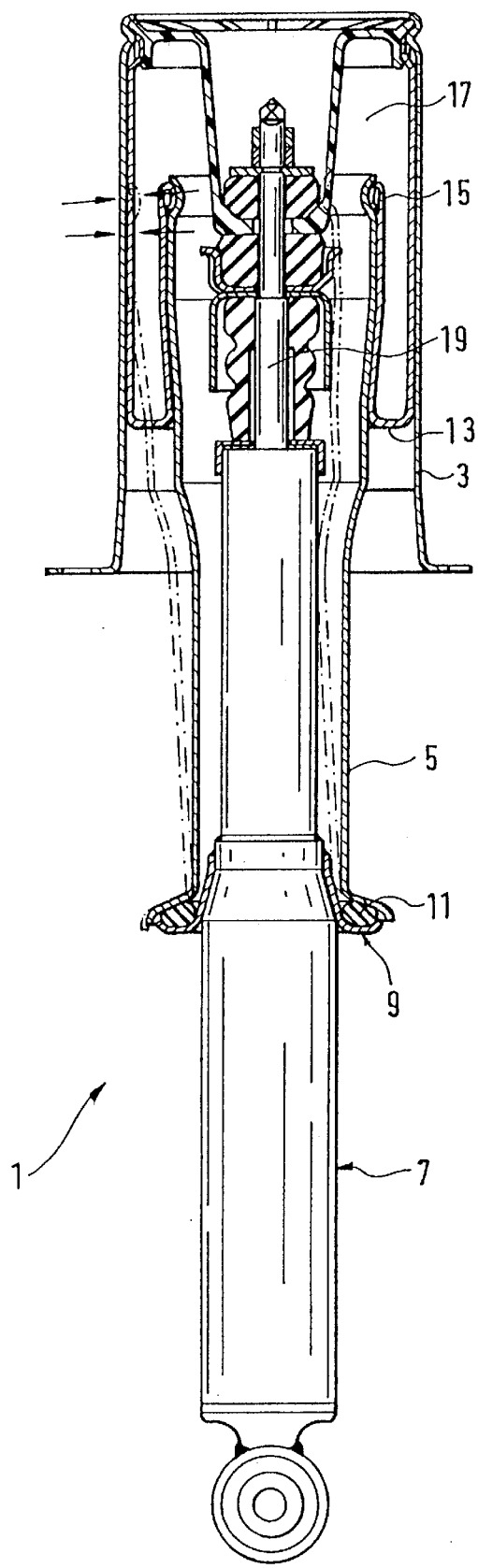
FIG. 1 shows a fully assembled pneumatic spring, without the shipping safety device.

FIG. 1 shows a pneumatic spring 1 which consists essentially of an outer suspension tube 3 and an inner suspension tube 5. The inner suspension tube 5 is in turn a component of a suspension unit, e.g. of a vibration damper or shock absorber 7. The inner suspension tube 5 is supported on the vibration damper 7 by means of a disc-shaped bearing 9 in connection with a seal 11. Roller bellows 13 are connected to the inner suspension tube 5 by means of a belt tension element, a band tension element, or a tape tension element 15, and when there is a deflection movement, the roller bellows 13 roll off the inner suspension tube 5. The part of the roller bellows 13 which rolls off the inner suspension tube 5 is crimped with respect to the inner tube 5. The outer tube 3 is also connected to the roller bellows 13, so that a suspension chamber or a spring chamber 17 is formed. A guide rod 19 of the vibration damper 7 is effectively connected to the outer tube 3. In this assembly step, the spring chamber 17 has not yet been filled with compressed air by means of a compressed air connection (not shown). The roller bellows 13 can be displaced radially by the amount marked with arrows, so that contact between the inner surfaces of the roller bellows 13 is still possible in this stage of assembly of the pneumatic spring 1. In this embodiment, the guide rod 19 stabilizes the entire pneumatic spring 1. But known systems also include pneumatic springs in which the reeling-off tube (the tube off which the roller bellows roll) is connected directly to the load to be suspended, so that the harmful effect on the inner surfaces of the roller bellows is even greater.

Figure 2:
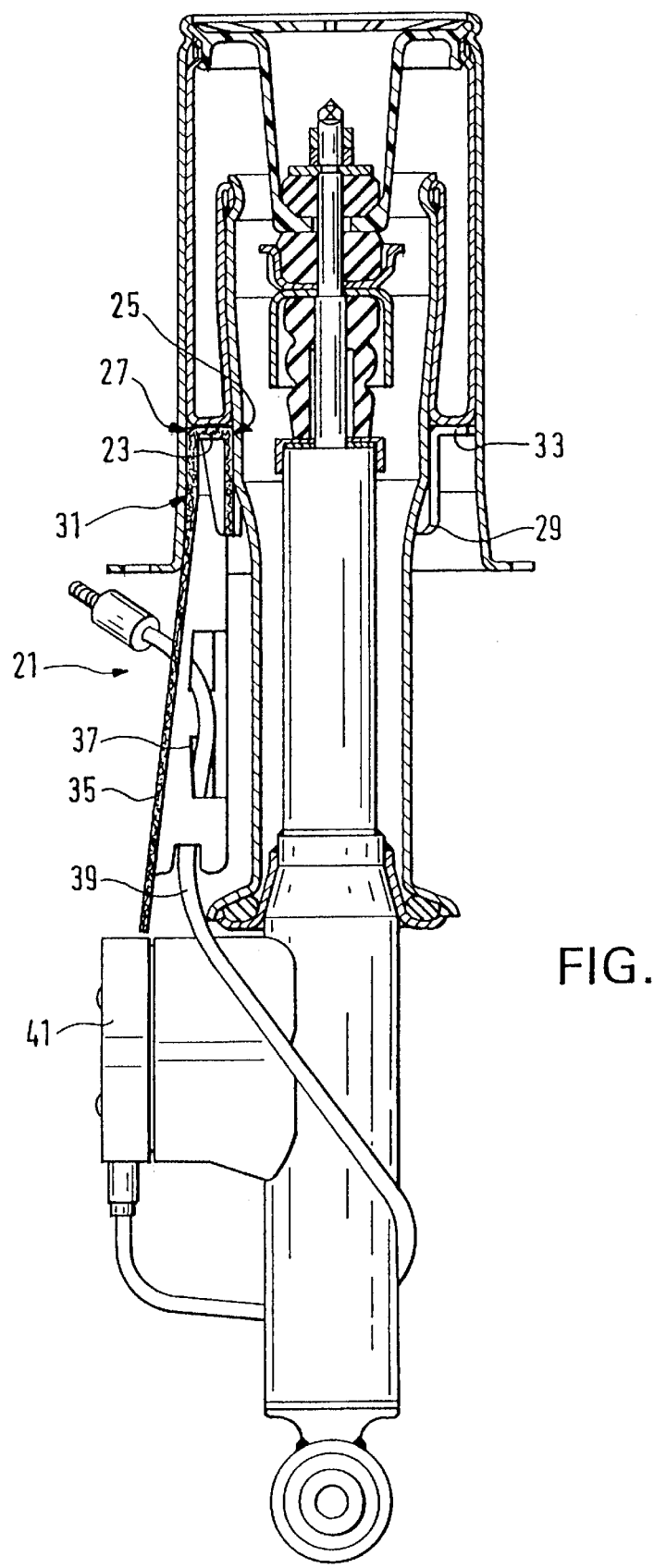
FIG. 2 shows a fully assembled pneumatic spring, with the shipping safety device.

FIG. 2 shows a completely assembled pneumatic spring with a shipping safety device 21. The most essential component of the shipping safety device 21 is a ring-shaped circular spacer 23 which surrounds the inner suspension tube 3 at least in sections. Located on the inside circumference or diameter 25 of the spacer 23 are guide webs 29 which are in contact with inner suspension tube 5, and located on the outside circumference or diameter 27 of the spacer 23 are guide webs 31 which are in contact with the outer suspension tube 3. The guide webs 29 and the guide webs 31 on the spacer 23 center the two suspension tubes 5, 3 with respect to one another so that a radial displacement is prevented, as illustrated in FIG. 2.

As shown in the right-hand sectional illustration of the spacer 23, the spacer 23 has a cross-slot or crosscut 33 which makes it possible to expand the shipping safety device 21 by offsetting the ends of the spacer 23, so that the safety shipping device 21 can be placed in its installed position. For this purpose, the shipping safety device 21 has a handle 35 which makes shipping safety device 21 easy to handle. The handle 35 has retaining eyelets 37 which perform the additional function of fastening cables and/or lines 39 during shipment. In this particular embodiment, the electrical power cable 39 of an outboard damping valve 41 of the vibration damper 7 has been threaded into the retaining eyelets 37.

Figure 3:
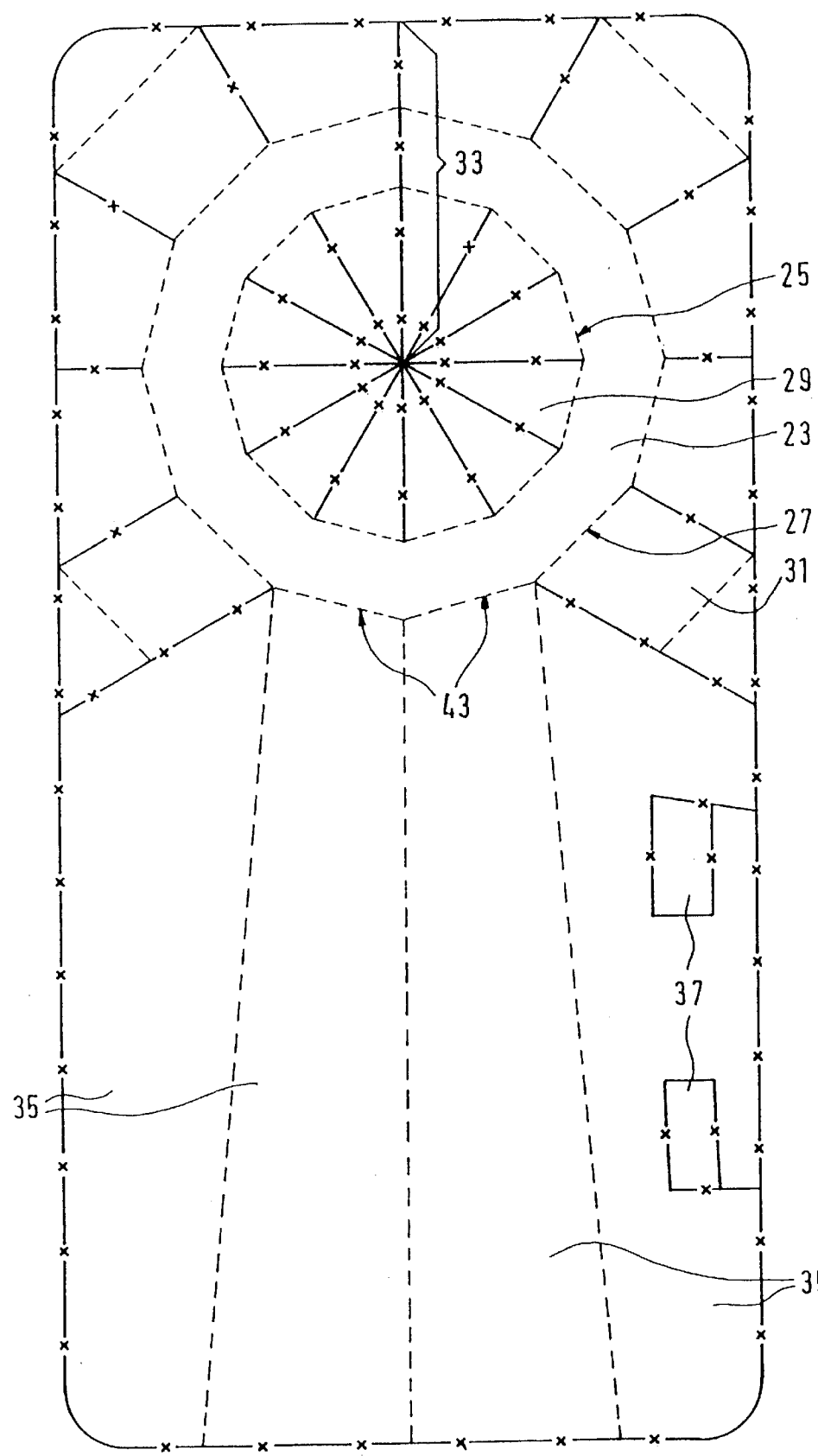
FIG. 3 shows a shipping safety device in a developed view.

For a clearer understanding of the shipping safety device 21, the safety device 21 is illustrated as in a developed view in FIG. 3. The broken lines represent folded edges, in contrast to the lines marked with "x", which form cut edges. Such a shipping safety device 21 can be manufactured very easily out of packing material. The manufacturing costs are quite low. In the first step of the process, a folding sheet is stamped out. Then it is cut and stamped along the specified lines. FIG. 3 clearly illustrates the spacer 23 with its guide webs 29 on inside diameter 25 and its guide webs 31 on the outside diameter 27 respectively. A right-angle fold must be made for the handle 35 at the transition 43. The four individual segments of the handle 35 can be folded to form a hollow body. As an alternative to the realization of the retaining eyelets 37 in the embodiment illustrated in FIG. 2, only two eyelets 37 are shown in the developed view of FIG. 3.

FIG. 3 also illustrates the cross-slot or crosscut 33 which breaks the continuity of ring-shaped circular spacer 23. The crosscut 33 produces two free ends of the ring-shaped spacer 23, which two free ends are adjacent to the crosscut 33, and which free ends of spacer 23 can be separated or expanded to install the shipping safety device 21.

After the pneumatic spring 1 has been fastened to a vehicle at the specified point and has been charged or pressurized, the shipping safety device 21 can be removed by means of the cross-slot 33. When the shipping safety device 21 is made of packing material, it is a disposable and non-reusable component. For reasons of environmental protection, of course, a reusable or recyclable material can also be used.

Figure 1A:
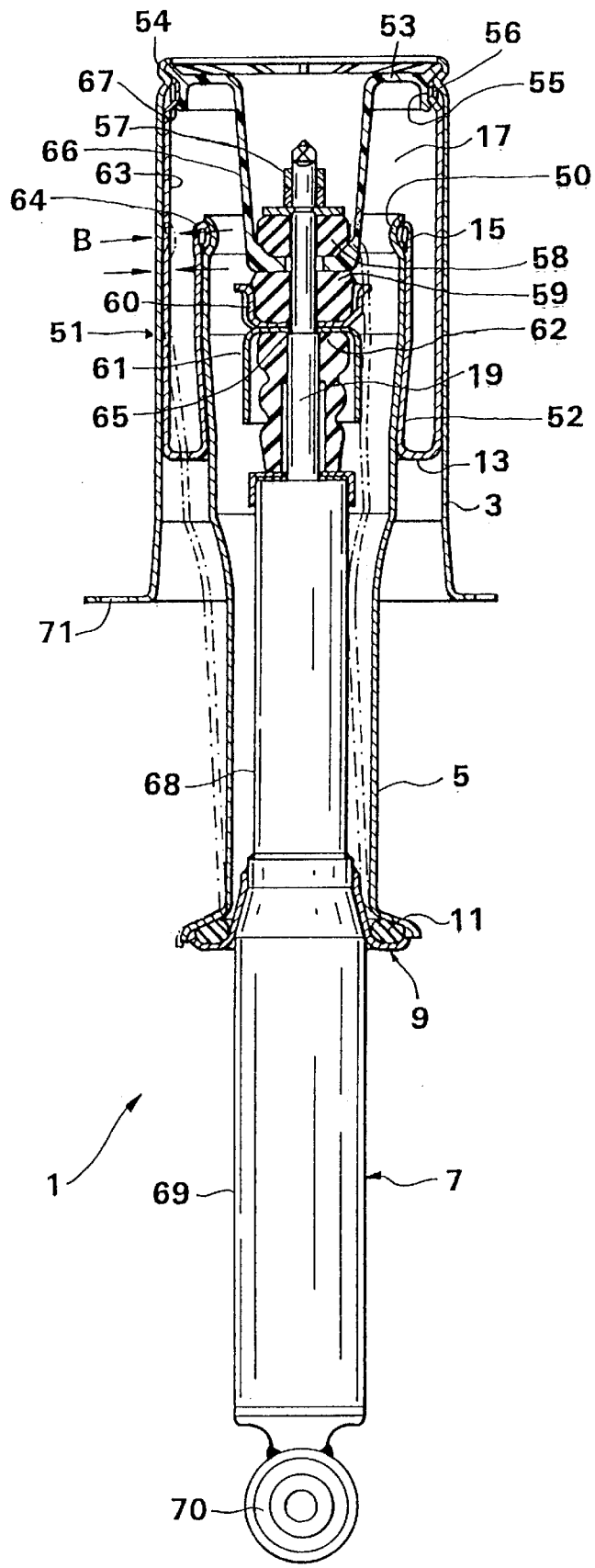
FIG. 1A shows a fully assembled pneumatic spring, without the shipping safety device.

FIG. 1A shows a pneumatic spring or pneumatic suspension unit 1, which consists of a pneumatic spring section 51 and a vibration damper or shock absorber section 7. The pneumatic spring section 51 consists essentially of an outer suspension tube 3 and an inner suspension tube 5. The inner suspension tube 5 is in turn a component of the vibration damper or shock absorber 7. The inner suspension tube 5 is supported on the vibration damper 7 by means of a disc-shaped bearing 9 in connection with a seal 11. The outer edge of the bearing 9 engages the inner suspension tube 5, and the seal 11 is held tightly between the disc-shaped bearing 9 and the inner suspension tube 5, thereby sealing between the bearing 9 and the inner suspension tube 5. Seal 11 could possibly be an O-ring seal. Roller bellows 13 is connected to the inner suspension tube 5 by means of a belt tension element, a band tension element, or a tape tension element 15. Inner suspension tube 5 has annular groove 50 at its upper end. When the band tension element 15 is crimped, the band tension element 15 engages annular groove 50, so that roller bellows 13 is held securely to the inner suspension tube 5. There is an inner portion 52 of the roller bellows 13, which inner portion 52 surrounds the inner suspension tube 5. When there is a deflection movement of the pneumatic suspension unit 1, such as when the unit is extended, the inner portion 52 of the roller bellows 13 rolls off the inner suspension tube 5. The inner portion 52 of the roller bellows 13 which rolls off the inner suspension tube 5 is crimped with respect to the inner tube 5 by band tension element 15, as discussed above. The outer tube 3 is also connected to the roller bellows 13, so that a suspension chamber or a spring chamber 17 is formed. The outer suspension tube 3 has a top 53 which is engaged by annular groove 54 of outer tube 3. The top 53 has an annular groove 55 for the crimping attachment of a band tension element 56. The end portion 67 of roller bellows 13 is held between band tension element 56 and top 53 of outer tube 3. A guide rod 19 of the vibration damper 7 is effectively connected to the outer tube 3; the central extension 66 of top 53 of outer tube 3 is connected to guide rod 19 by a connection element 57, which is typically a nut and a threaded section of guide rod 19. Connection element 57 also holds elastomer bushings 58, 59, and 62 and support cups 60 and 61 in place on guide rod 19. Together the elastomer bushings 58, 59, and 62 and support cups 60 and 61 help seal spring chamber 17 and also provide additional dampening. Guide rod 19 has a raised portion 65 which prevents support cup 61 from moving beyond raised portion 65, in a direction away from connection element 57. In addition, support cup 60, bushings 58 and 59, and top 53 are all held in position between support cup 61 and connection element 57. In this assembly step, the spring chamber 17 has not yet been filled with compressed air by means of a compressed air connection (not shown). The roller bellows 13 can be displaced radially by the amount marked with arrows B, so that contact between the inner surfaces of the roller bellows 13 is still possible in this stage of assembly of the pneumatic spring 1. More specifically, the end portion or inner surface 64 of the roller bellows 13 which is held to inner tube 5 by band tension element 15, and the end portion 67 of roller bellows 13 is held to top 53 of outer tube 3. End portion or inner surface 64 can move radially with inner tube 15, so that the end portion 64 of the roller bellows 13 can contact the intermediate portion or inner surface 63 of the roller bellows 13, which inner surface 63 is adjacent the outer tube 3, and which inner surface 63 is in between the end portions 64 and 67 of the roller bellows 13. The contact between the inner surface 64 and the inner surface 63 can occur when inner tube 5 moves radially with respect to outer tube 3, as shown in broken lines in FIG. 1A. The contact between the inner surfaces 63 and 64 of roller bellows 13 can damage the roller bellows 13. In this embodiment, the guide rod 19 stabilizes the entire pneumatic suspension unit 1. But other known systems also include pneumatic springs in which the reeling-off tube (the tube off which the roller bellows roll) is connected directly to the load to be suspended, so that the harmful effect on the inner surfaces of the roller bellows is even greater, because there is no guide bar to help stabilize movement between the inner and outer suspension tubes.

In reference to FIG. 1A, it can be seen that after the end portion 64 of inner portion 52 of the roller bellows 13 is crimped by way of tape tension element 15 to the inner suspension tube 5, the inner portion 52 of the roller bellows 13 must be pulled over the inner suspension tube 5, in order to surround the inner suspension tube 5 with the inner portion 52 of the roller bellows 13. In pulling the roller bellows 13 over the inner suspension tube 5, the end portion 64 of the roller bellows 13, in the vicinity of tape tension element 15, encircles or surrounds the tension element 15 creating a pleat or fold at the inner surface 64 of the roller bellows 13, which inner surface or end portion 64 is the point at which contact can occur with the adjacent inner surface 63 of the roller bellows 13. Thus, damage can occur to the roller bellows 13 adjacent to the tape tension element 15 where roller bellows 13 encircles the crimped tape tension element 15. In addition, damage can occur to the inner surface 63, of the roller bellows 13 adjacent the outer suspension tube 3, and damage can occur to the end portion/inner surface 64, of the roller bellows 13 adjacent the tape tension element 15, if the two inner surfaces 63 and 64 contact one another. In addition the upper edge of the annular groove 50 can possibly damage the inner surface 63 of the roller bellows 13, if the upper edge of the annular groove 50 would contact the inner surface 63 of the roller bellows 13. One of the purposes of the present invention is to prevent this damage.

The spring chamber 17 has an inside surface made up of multiple components; the basic components of the inside surface include the elastic roller bellows 13, the top 53 of the outer tube 3, bushings 59 and 62, support cups 60 and 61, the inner cylinder 68, and the inner suspension tube 5. The spring chamber 17 has an outside surface made up of multiple components; the basic components include the inner suspension tube 5, the elastic roller bellows 13, and the top 53 of the outer tube 3; in addition, the outer suspension tube 3 together with the portion of elastic roller bellows 13 which contacts the outer suspension tube 3 form a portion of the outside surface of the spring chamber 17.

FIG. 1A also shows the vibration damper 7 is preferably equipped with connecting mechanism 70 preferably for attachment to a wheel mounting of a motor vehicle. In addition, outer suspension tube 3 is equipped with a connecting mechanism 71 preferably for attachment to the body of a motor vehicle; in the embodiment pictured in FIG. 1A connecting mechanism 71 takes the form of a hole for bolting the outer suspension tube 3 to the body of a motor vehicle. Thus, the outer suspension tube 3, which outer suspension tube 3 is connected to elastic roller bellows 13 by way of band tension element 56, serves to connect the end 67 of elastic roller bellows 13 to the body of a motor vehicle. In an alternative embodiment (not pictured) the top 53 of outer suspension tube 3, or the upper portion of outer suspension tube 3, is equipped with an attachment mechanism, so that the outer suspension tube 3 is essentially attached to a vehicle near the top 53 of the outer suspension tube 3 instead of the lower portion of the outer suspension tube 3 (as pictured in FIG. 1A). The inner suspension tube 5, which inner suspension tube 5 is connected to the elastic roller bellows 13 by way of band tension element 15, also serves the purpose of connecting the end 64 of elastic roller bellows 13 to a wheel mounting of a motor vehicle. In the embodiment of FIG. 1A, the inner suspension tube 5 together with outer cylinder 69 and connecting mechanism 70 connect the elastic roller bellows 13 to a wheel mounting of a motor vehicle. In an alternative embodiment (not pictured) the inner suspension tube 5 can be mounted directly on a portion of a vehicle, rather than being mounted on the outer cylinder 69 of the vibration damper 7; in this alternative embodiment (not pictured) an alternative mechanism for forming the sealed spring chamber 17 would be needed.

Figure 2A:
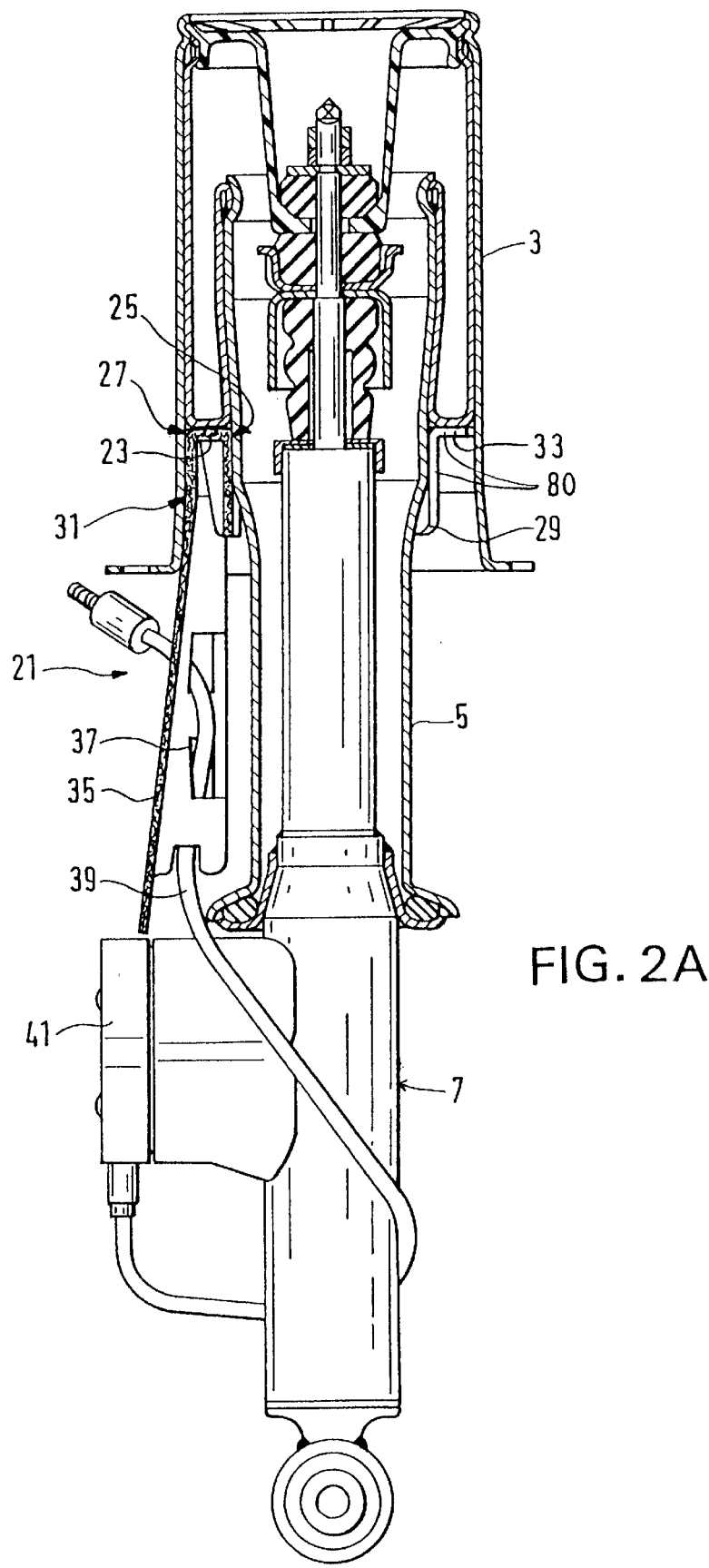
FIG. 2A shows a fully assembled pneumatic spring, with the shipping safety device.

FIG. 2A shows a completely assembled pneumatic suspension unit or spring with a shipping safety device 21 installed. The most essential component of the shipping safety device 21 is a ring-shaped circular spacer 23 which surrounds the inner suspension tube 5 at least in sections. Located on the inside diameter 25 of ring-shaped spacer 23 are guide webs 29 which are in contact with the inner suspension tube 5. Located on the outside diameter 27 of the ring-shaped spacer 23 are guide webs 31 which are in contact with the outer suspension tube 3. Thus, the shipping safety device 21 is adjacent the outside surface of the spring chamber 17, and the shipping safety device 21 occupies the space between the inner suspension tube 5 and the outer suspension tube 3. The combination, of the ring-shaped spacer 23 and the guide webs 29 and 31, centers the two suspension tubes 5 and 3 with respect to one another, so that a radial displacement is prevented, as was illustrated in FIG. 1 and 1A. In other words, the inner suspension tube 5 is centered with respect to the outer suspension tube 3, so that the longitudinal axis of the inner suspension tube 5 is coaxial with the longitudinal axis of the outer suspension tube 3. Similarly, the inner suspension tube 5 is centered with respect to the outer suspension tube 3, so that movement is limited between the longitudinal axis of the inner suspension tube 5 and the longitudinal axis of the outer suspension tube 3, which movement is limited in a direction that is transverse to both of the longitudinal axes.

FIG. 2A shows in the right-hand portion of the sectional illustration of the ring-shaped spacer 23 that the ring-shaped spacer 23 has a cross-slot or crosscut 33. The crosscut 33 produces an opening through the ring-shaped spacer 23, so that ring-shaped spacer 23 has two free ends of the spacer 23. One free end 80 of the ring-shaped spacer 23 is seen in FIG. 2A, which free end 80 is formed by the crosscut 33 through the ring-shaped spacer 23 and the inner guide web 29. The crosscut 33 makes it possible to expand the ring-shaped spacer 23 of shipping safety device 21 by offsetting the free ends of the spacer 23, so that the safety shipping device 21 can be placed in its installed position around inner suspension tube 5. To help install the shipping safety device 21, the shipping safety device 21 has a handle 35 which makes shipping safety device 21 easy to manipulate. In FIG. 2A, the handle 35 is essentially an extension of a guide web 31. The handle 35 has retaining eyelets 37 which perform the additional function of fastening cables and/or lines 39 during shipment. In this particular embodiment, the electrical power cable 39 of an outboard damping valve 41 of the vibration damper 7 has been threaded into the retaining eyelets 37.

The present invention also includes a method for packing, shipping, and installing a pneumatic-spring shock-absorber assembly 1 by using the shipping safety device 21 in the method. The first step is that a fully assembled pneumatic-spring shock-absorber assembly 1 be provided. Next, the shipping safety device 21 is installed on the pneumatic-spring shock-absorber assembly 1. Prior to the installation of the shipping safety device 21, if the inner suspension tube 5 is not stabilized relative to the outer suspension tube 3, damage can occur to the elastic roller bellows 13 as discussed earlier. Therefore, in some applications the fully assembled pneumatic-spring shock-absorber assembly 1 is held in a stabilized position on the assembly line. So prior to and during the installation of the shipping safety device 21, the pneumatic-spring shock-absorber assembly 1 is held in a stabilized position on the assembly line. Only after the shipping safety device 21 is installed is the pneumatic-spring shock-absorber assembly 1 removed from the assembly line, because once the shipping safety device 21 is installed between the inner suspension tube 5 and the outer suspension tube 3 the required stabilization is provided by the shipping safety device 21. The next step is to pack the pneumatic-spring shock-absorber assembly 1, which assembly 1 has the shipping safety device 21 installed in place. The advantage of the present invention is realized in the packing step, since smaller packing material such as boxes can be used compared to known methods of stabilizing the pneumatic-spring shock-absorber assembly 1. The known method of achieving stabilization during packing and shipping is to charge the air spring chamber 17 with gas; stabilization is achieved, but the pneumatic-spring shock-absorber assembly 1 is longer as a result of the, pressurized air spring chamber 17, so either larger packing materials are required in the known method or fewer pneumatic-spring shock-absorber assemblies are able to fit in each box in the known method. After packing the pneumatic-spring shock-absorber assembly it can be shipped to the place of sale or installation; this could possibly include a vehicle manufacturing plant or a location where vehicle repair is done, among other places. The pneumatic-spring shock-absorber assembly 1 can then be unpacked with the installed shipping safety device 21 remaining in place. Next, the pneumatic-spring shock-absorber assembly 1 is installed on a vehicle. Once the pneumatic-spring shock-absorber assembly is installed and stabilized by the installation process, the shipping safety device 21 can be removed. In some applications, the air spring chamber 17 may have to be charged with gas to achieve adequate stabilization of the pneumatic-spring shock-absorber assembly 1, before the shipping safety device 21 can be removed. That is, the pneumatic-spring shock-absorber assembly should be both installed on the vehicle and charged with gas before the shipping safety device 21 can safely be removed.

Figure 4:
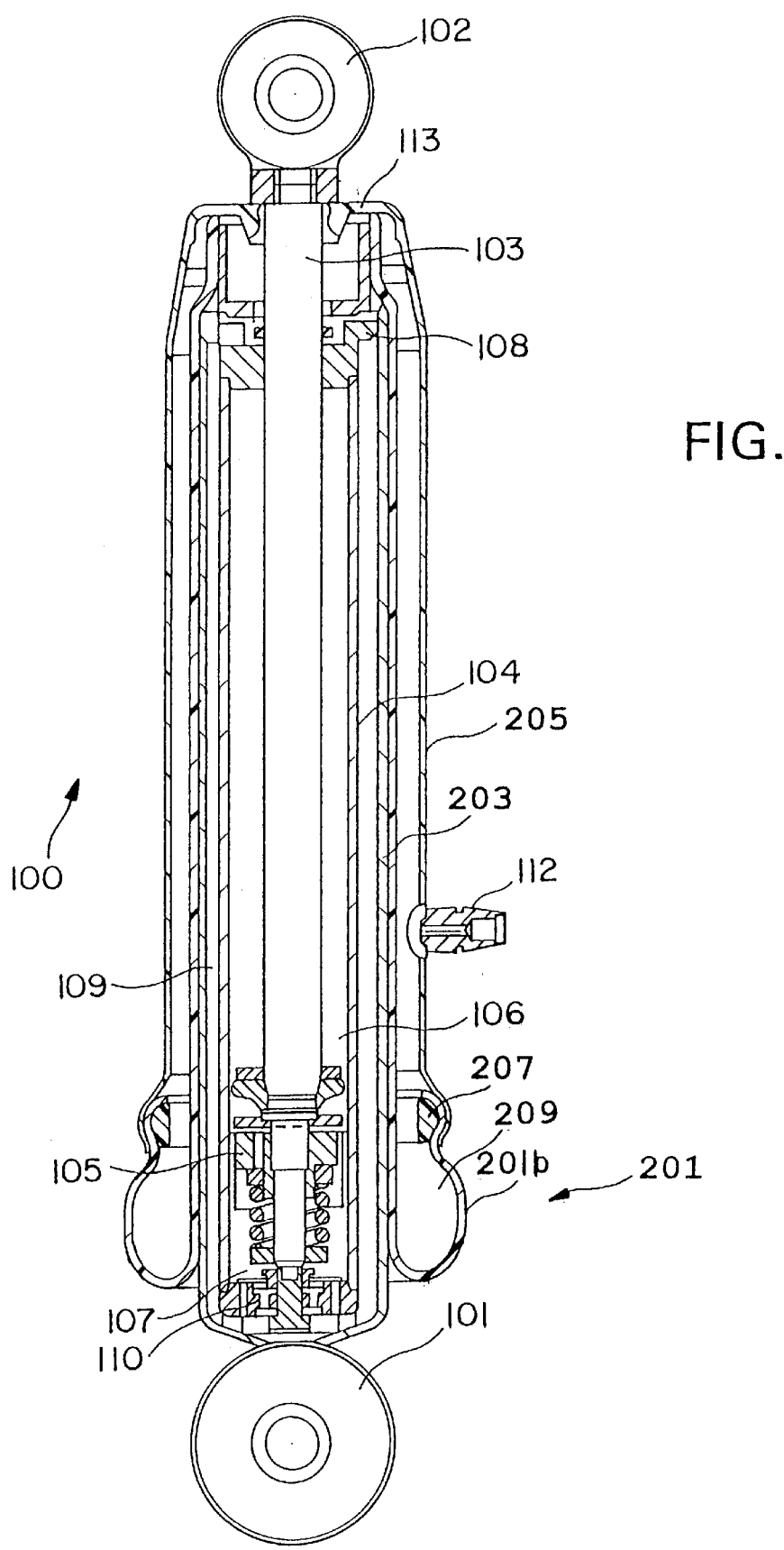
FIG. 4 shows an alternative embodiment of a pneumatic spring.

FIG. 4 shows one example of a complete shock absorber or vibration damper 100 which incorporates a pneumatic spring 201. The shock absorber 100 can generally include the tubular body 203, the end of which tubular body 203 can preferably be equipped with a connecting mechanism 101 for attachment to a wheel mounting of a motor vehicle. The shock absorber 100 can also include an additional connecting mechanism 102 disposed a distance away from connecting mechanism 101, preferably for attachment to the body of the motor vehicle. Further, external tube 205 can preferably be disposed about the tubular body 203.

A piston rod 103 can preferably project into an inner cylinder 104 of the shock absorber 100, which inner cylinder 104 can preferably be disposed within tubular body 203. The piston rod 103 can preferably have the connection 102 for attaching the piston rod 103 to the body of the motor vehicle. A piston 105 equipped with a damping valve can be attached to one end of the piston rod 103. The piston rod 103, along with its piston 105, can preferably move axially within cylinder 104. The piston 105 divides the cylinder 104 into an upper working chamber 106 and a lower working chamber 107. The piston rod 103 can preferably be guided inside cylinder 104 by a piston rod guide 108.

The inside diameter of the tubular body 203 and the outside diameter of the cylinder 104 can preferably form an equalization chamber 109 for the cylinder 104, and the cylinder 104 can be connected to the equalization chamber 109 via a base valve 110.

The shock absorber 100 includes the pneumatic spring 201, which pneumatic spring 201 can preferably be pressurized via a pressure connection 112. The pressure connection 112 can preferably be located along external tube 205. The pneumatic spring 201 has roller bellows 201b, which roller bellows 201b and external tube 205 form pneumatic spring chamber 209. Retainer ring 207 holds roller bellows 201b in place on external tube 205.

One possible mode of operation of the pneumatic spring shown in FIG. 4 can preferably be as follows. The pneumatic spring 201 can preferably be pressurized via pressure connection 112. Pneumatic spring chamber 209 can then expand and cause movement of the external tube 205. The external tube 205 can preferably be connected to the piston rod 103 via an end piece 113. The substantially axial movement of the external tube 5 can preferably cause axial movement of the piston rod 103 to provide additional damping characteristics.

In one embodiment, (see FIG. 3) the mechanical device for limiting movement is made of a single sheet of packing material having a length to width ratio of two to one; the inside diameter has a center; the outside diameter has a center, which center is the same as the center of the inside diameter; the center is centered along the width of the sheet, and the center is substantially one-fourth of the length of the sheet from one edge along the length of the sheet, and substantially three-fourths of the length of the sheet from the opposite edge along the length of the sheet; the opening of the ring-shaped spacer is formed by a cut that extends from the center to the edge which is one-fourth the length of the sheet from the center along the length of the sheet; the plurality of inner guide webs is formed by a series of cuts, the first cut is the cut which formed the opening of the ring-shaped spacer, adjacent cuts are separated by angles of substantially thirty degrees, which adjacent cuts extending along radial lines from the center, which adjacent cuts go to the inside diameter but not beyond the inside diameter; a bend between each of the inner guide webs and the inside diameter orients the inner guide webs substantially perpendicular to the ring-shaped spacer; the cuts forming the inner guide webs are substantially one-eighth the length of the sheet in length; the length of each inner guide web along the inside diameter is substantially one-sixteenth the length of the sheet; the ring-shaped spacer is substantially one-sixteenth the length of the sheet wide between the inside diameter and the outside diameter; the plurality of outer guide webs is formed by a series of cuts between the outer guide webs: a first cut is the cut which formed the opening of the ring-shaped spacer; four adjacent cuts on each side of the first cut extend radially from the outside diameter in a direction away from the center, which cuts are along the same radial lines of the inner cuts, which cuts continue through the edge of the sheet, which cuts form four outer guide webs on each side of the first cut; and an additional adjacent cut substantially parallel to each of the fourth cuts, each of which parallel cuts is from the outside diameter to the edge of the sheet, which parallel cuts each form an additional outer guide web, and which parallel cuts separate the handle from the outer guide webs; a bend between each of the outer guide webs and the outside diameter orients the outer guide webs substantially perpendicular to the ring-shaped spacer; the length of each outer guide web along the outside diameter is substantially one-tenth the length of the sheet; the cuts forming the outer guide webs vary from substantially one-sixteenth the length of the sheet in length to one-sixth the length of the sheet in length, depending on the distance from the outside diameter to the edge of the sheet; the handle extends from the outside diameter to the edge of the sheet which is three-fourths the length of the sheet from the center along the length of the sheet; the handle comprises four sections, the four sections are formed by three bends: a first bend is along the center of the length of the sheet extending along the length of the sheet, which first fold is substantially thirty degrees from a plane formed by the sheet; and two more bends extend along the length of the handle and divide the width of the sheet into substantially one-fourths, which two bends are each substantially ninety degrees or more; and a bend between the handle and the outside diameter orients the handle substantially perpendicular to the ring-shaped spacer.

One feature of the invention resides broadly in the pneumatic spring or air spring, comprising an outer suspension tube and an inner suspension tube of a pneumatic suspension unit or gas-filled shock absorber, whereby there are elastic roller bellows which are effectively connected to the outer and inner suspension tube and form a spring or suspension chamber, whereby the roller bellows are crimped inward on one end over an encircling fold, characterized by the fact that when the roller bellows 13 are in the fully assembled state, a transport safety device 21 is located on the pneumatic spring and centers the outer suspension tube 3 with respect to the inner suspension tube, so that contact between the crimped part and the part of the roller bellows enveloping or adjacent to this crimped part is prevented.

Another feature of the invention resides broadly in the pneumatic spring characterized by the fact that the shipping safety device 21 consists essentially of a ring-shaped circular spacer 23 which at least partly surrounds the inner suspension tube.

Yet another feature of the invention resides broadly in the pneumatic spring characterized by the fact that the spacer has a cross-slot or crosscut 33, by means of which the spacer for the inner suspension tube can be expanded.

Still another feature of the invention resides broadly in the pneumatic spring characterized by the fact that guide webs 29 are located on the inside diameter 25 of the spacer.

A further feature of the invention resides broadly in the pneumatic spring characterized by the fact that guide webs 31 are located on the outside diameter 27 of the spacer.

Another feature of the invention resides broadly in the pneumatic spring characterized by the fact that the spacer has a handle 35.

Yet another feature of the invention resides broadly in the pneumatic spring characterized by the fact that the handle has a number of retaining eyelets 37.

Still another feature of the invention resides broadly in the pneumatic spring characterized by the fact that the shipping safety device 21 is made of packing material.

Examples of couplings which use crimping and could possibly be used with the present invention for crimping the roller bellows to the suspension tubes can be found in the following U.S. patents: U.S. Pat. No. 5,190,323 entitled "High pressure coupling"; U.S. Pat. No. 5,255,944 entitled "Coupler for textile-reinforced rubber hose"; U.S. Pat. No. 5,303,963 entitled "Crimped hose coupling for reinforced hoses"; U.S. Pat. No. 5,370,425 entitled "Tube-to-hose coupling (spin-sert) and method of making same"; and U.S. Pat. No. 5,437,177 entitled "Portable collet crimping apparatus".

Examples of methods for the manufacturing of shock absorbers and vibration dampers can possibly be found in the following U.S. patents: U.S. Pat. No. 5,398,789 entitled "Method of making a vibration damper and a vibration damper and a method for producing a container tube-side tube unit of a vibration damper, a preproduct and an intermediate product for this vibration damper"; U.S. Pat. No. 5,416,962 entitled "Method of manufacture of vibration damper"; U.S. Pat. No. 5,193,787 entitled "Sleeve and bushing assembly and method of manufacturing the same"; U.S. Pat. No. 4,199,855 entitled "Plastic dust tube for shock absorber and method of manufacture"; and U.S. Pat. No. 4,222,805 entitled "Plastic dust tube for shock absorber and method of manufacture".

An example of a pneumatic-spring shock-absorber can possibly be found in U.S. Pat. No. 5,346,187 entitled "Roll bellows-type pneumatic shock absorber having a reinforced roll bellows".

The components disclosed in the various publications, disclosed or incorporated by reference herein, may be used in the embodiments of the present invention, as well as, equivalents thereof.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. 195 08 852.2, filed on Mar. 11, 1995, having inventor Robert Pradel, and DE-OS 195 08 852.2 and DE-PS 195 08 852.2, as well as their published equivalents.

The invention as described hereinabove in the context of the preferred embodiments is not to be taken as limited to all of the provided details thereof, since modifications and variations thereof may be made without departing from the spirit and scope of the invention.

What is claimed is:

1. A pneumatic-spring shock-absorber assembly comprising:

a cylinder;

an arrangement for connecting said cylinder to a first portion of a vehicle;

a piston, said piston being slidably mounted inside said cylinder;

said piston dividing said cylinder into two working chambers;

a piston rod being connected to said piston to move with said piston;

an arrangement for connecting said piston rod to a second portion of a vehicle;

a pneumatic-spring chamber, said pneumatic spring chamber comprising:

an elastic roller bellows, said elastic roller bellows comprising:
a first end;
a second end; and
a portion between said first end and said second end;
an inner suspension tube;
said inner suspension tube having a longitudinal axis;
an arrangement for connecting said bellows first end to said inner suspension tube;
an outer suspension tube;
said outer suspension tube having a longitudinal axis; and
an arrangement for connecting said outer suspension tube to said bellows second end;

said pneumatic-spring chamber comprising an inside surface to contain a gas within said pneumatic-spring chamber;

said pneumatic-spring chamber comprising an outside surface, said outside surface being disposed opposite said inside surface;

said inner suspension tube being movable with respect to said bellows between portion in a direction substantially transverse to the inner suspension tube longitudinal axis;

the pneumatic-spring shock-absorber assembly further comprising a mechanical transport-safety-device;

said mechanical transport-safety-device limits movement between said inner suspension tube and said bellows between portion in the direction substantially transverse to the inner suspension tube longitudinal axis to prevent damage to said bellows;

said mechanical transport-safety-device being removably disposed substantially adjacent to said outside surface of said pneumatic-spring chamber, during shipping and before use of the pneumatic-spring shock-absorber assembly;

said mechanical transport-safety-device comprising a mechanical arrangement for occupying a space between said inner suspension tube and said outer suspension tube;

said mechanical arrangement for occupying a space being removably disposed in the space between said inner suspension tube and said outer suspension tube; and said mechanical arrangement for occupying a space comprises an arrangement for centering said inner suspension tube with respect to said outer suspension tube to orient the longitudinal axis of said inner suspension tube substantially coaxial with the longitudinal axis of said outer suspension tube.

2. The pneumatic-spring shock-absorber assembly according to claim 1, wherein:

said first end of said elastic roller bellows is movable with respect to said bellows between portion; and said mechanical arrangement for occupying a space is disposed to limit movement between said first end of said elastic roller bellows and said bellows between portion to minimize contact between said first end of said elastic roller bellows and said bellows between portion.

3. The pneumatic-spring shock-absorber assembly according to claim 2, wherein:

said arrangement for centering said inner suspension tube with respect to said outer suspension tube comprises a ring-shaped spacer to at least partly surround said inner suspension tube.

4. The pneumatic-spring shock-absorber assembly according to claim 3, wherein:

said ring-shaped spacer comprises an opening to permit expansion of said ring-shaped spacer to install said ring-shaped spacer to at least partly surround said inner suspension tube.

5. The pneumatic-spring shock-absorber assembly according to claim 4, wherein:

said ring-shaped spacer has an inside diameter defining an inside circumference of said ring-shaped spacer; and said ring-shaped spacer comprises a plurality of inner guide webs connected to said ring-shaped spacer at the inside circumference of said ring-shaped spacer, said inner guide webs to support said mechanical transport-safety-device on said inner suspension tube.

6. The pneumatic-spring shock-absorber assembly according to claim 5, wherein:

said ring-shaped spacer has an outside diameter defining an outside circumference of said ring-shaped spacer; and said ring-shaped spacer comprises a plurality of outer guide webs connected to said ring-shaped spacer at the outside circumference of said ring-shaped spacer, said outer guide webs to support said outer suspension tube.

7. The pneumatic-spring shock-absorber assembly according to claim 6, wherein:

at least one of said plurality of outer guide webs is substantially longer than others of said outer guide webs to form a handle for manipulation of said mechanical transport-safety-device.

8. The pneumatic-spring shock-absorber assembly according to claim 7, wherein:

said handle comprises at least one hole to form a retaining eyelet to retain accessories such as control cables or lines;

said pneumatic-spring shock-absorber assembly comprises an arrangement for connecting said inner suspension tube to said cylinder;

said pneumatic-spring shock-absorber assembly comprises an arrangement for connecting said outer suspension tube to a second portion of a vehicle;

said arrangement for connecting said bellows first end to said inner suspension tube comprises an arrangement for crimping said bellows first end to said inner suspension tube;

said mechanical transport-safety-device is made of a single sheet of packing material having a length to width ratio of substantially two to one;

the inside diameter of said ring-shaped spacer has a center;

the outside diameter of said ring-shaped spacer has a center, the outside diameter of said ring-shaped spacer center is the same as the inside diameter of said ring-shaped spacer center;

the center is substantially centered along the width of said sheet, and the center is disposed substantially one-fourth of the length of said sheet from one edge of said sheet in a direction along the length of said sheet, and the center is disposed substantially three-fourths of the length of said sheet from an edge opposite to said edge in a direction along the length of said sheet;

said opening of said ring-shaped spacer is formed by a cut that extends from the center to said edge that is substantially one-fourth the length of said sheet from the center in a direction along the length of said sheet;

said plurality of inner guide webs is formed by:
a first cut, the first cut is the cut forming the opening of said ring-shaped spacer; and
a plurality of adjacent cuts, the plurality of adjacent cuts are separated by angles of substantially thirty degrees, the adjacent cuts extend along radial lines from the center, the adjacent cuts go to the inside circumference of said ring-shaped spacer but not beyond the inside circumference of said ring-shaped spacer;

a bend between each of said inner guide webs and the inside circumference of said ring-shaped spacer orients said inner guide webs substantially perpendicular to said ring-shaped spacer;

the cuts forming said inner guide webs are substantially one-eighth the length of said sheet in length;

a length of each inner guide web adjacent the inside circumference of said ring-shaped spacer is substantially one-sixteenth the length of said sheet;

said ring-shaped spacer has a width between the inside circumference of said ring-shaped spacer and the outside circumference of said ring-shaped spacer, the ring-shaped spacer width is substantially one-sixteenth the length of said sheet;

said plurality of outer guide webs is formed by:
a first cut, the first cut is the cut forming the opening of said ring-shaped spacer;
four adjacent cuts on each side of the first cut extending radially from the outside circumference of said ring-shaped spacer in a direction away from the center, the four adjacent cuts on each side are along the same radial lines of the inner cuts, each of the four adjacent cuts on each side continue through an edge of said sheet, the four adjacent cuts on each side form four outer guide webs on each side of the first cut; and an additional adjacent cut substantially parallel to one of each of the four cuts disposed farthest from the first cut forming the outer guide webs, each of which parallel cuts is from the outside circumference of said ring-shaped spacer to an edge of said sheet, the parallel cuts each form an additional outer guide web, and the parallel cuts separate said handle from others of said outer guide webs;

a bend between each of said outer guide webs and the outside circumference of said ring-shaped spacer orients said outer guide webs substantially perpendicular to said ring-shaped spacer;

a length of each outer guide web adjacent the outside circumference of said ring-shaped spacer is substantially one-tenth the length of said sheet;

lengths of the cuts forming the outer guide webs vary from substantially one-sixteenth the length of said sheet in length to substantially one-sixth the length of said sheet in length, depending on the distance from the outside circumference of said ring-shaped spacer to said edge of said sheet;

said handle extends from the outside circumference of said ring-shaped spacer to said edge of said sheet that is substantially three-fourths the length of said sheet from the center in a direction along the length of said sheet;

said handle comprises four sections, said four sections are formed by:
 a first bend substantially along the center of the length of said sheet extending along the length of said sheet, said first bend is substantially thirty degrees from a plane formed by said sheet; and
 two additional bends extending along the length of said handle and dividing the width of said sheet into substantially one-fourths, which two bends are each substantially ninety degrees or more; and a bend between said handle and the outside circumference of said ring-shaped spacer orients said handle substantially perpendicular to said ring-shaped spacer.

9. A pneumatic-spring shock-absorber shipping assembly comprising a pneumatic-spring shock-absorber and a mechanical transport-safety-device, the shipping assembly for being used prior to installation of the shipping assembly in a motor vehicle to reduce damage to the roller bellows during shipping, said shipping assembly comprising:
 a pneumatic-spring shock-absorber, said pneumatic-spring shock-absorber comprising:
  a cylinder;
  an arrangement for connecting said cylinder to a first portion of a vehicle;
  a piston, said piston being slidably mounted inside said cylinder;
  said piston dividing said cylinder into two working chambers;
  a piston rod being connected to said piston to move with said piston;
  an arrangement for connecting said piston rod to a second portion of a vehicle;
  a pneumatic-spring chamber, said pneumatic spring chamber comprising:
   an elastic roller bellows, said elastic roller bellows comprising:
    a first end;
    a second end; and
    a portion between said first end and said second end;
   an arrangement for connecting said bellows first end to the first portion of a vehicle; and
   an arrangement for connecting said bellows second end to the second portion of a vehicle;
  said pneumatic-spring chamber comprising an inside surface to contain a gas within said pneumatic-spring chamber;
  said pneumatic-spring chamber comprising an outside surface, said outside surface being disposed opposite said inside surface;
  said first end of said elastic roller bellows being movable with respect to said bellows between portion;
 said shipping assembly further comprising a mechanical transport-safety-device;
 said mechanical transport-safety-device limits movement between said first end of said elastic roller bellows and said bellows between portion during shipping, to prevent damage to said bellows;
 said first end of said elastic roller bellows being movable to make contact with said bellows between portion during shipping, in absence of said mechanical transport-safety-device;
 said mechanical transport-safety-device to minimize contact between said first end of said elastic roller bellows and said bellows between portion;
 said mechanical transport-safety-device being removably disposed adjacent to said outside surface of said pneumatic-spring chamber;
 said mechanical transport-safety-device comprising a mechanical arrangement for occupying a space between said bellows first end connecting arrangement and said bellows second end connecting arrangement; and
 said mechanical arrangement for occupying a space being removably disposed in the space between said bellows first end connecting arrangement and said bellows second end connecting arrangement.

10. The pneumatic-spring shock-absorber assembly according to claim 9, wherein:
 said mechanical arrangement for occupying a space comprises an arrangement for centering said bellows first end connecting arrangement with respect to said bellows second end connecting arrangement to center said first end of said elastic roller bellows with respect to said bellows between portion.

11. The pneumatic-spring shock-absorber assembly according to claim 10, wherein:
 said arrangement for centering said bellows first end connecting arrangement with respect to said bellows second end connecting arrangement comprises a ring-shaped spacer for at least partly surrounding said bellows first end connecting arrangement.

12. The pneumatic-spring shock-absorber assembly according to claim 11, wherein:
 said ring-shaped spacer comprises an opening to permit expansion of said ring-shaped spacer to install said ring-shaped spacer to at least partly surround said bellows first end connecting arrangement.

13. The pneumatic-spring shock-absorber assembly according to claim 12, wherein:
 said ring-shaped spacer has an inside diameter defining an inside circumference of said ring-shaped spacer; and
 said ring-shaped spacer comprises a plurality of inner guide webs connected to said ring-shaped spacer at the inside circumference of said ring-shaped spacer, said inner guide webs to support said mechanical transport-safety-device on said bellows first end connecting arrangement.

14. The pneumatic-spring shock-absorber assembly according to claim 13, wherein:
said ring-shaped spacer has an outside diameter defining an outside circumference of said ring-shaped spacer; and
said ring-shaped spacer comprises a plurality of outer guide webs connected to said ring-shaped spacer at the outside circumference of said ring-shaped spacer, said outer guide webs to support said bellows second end connecting arrangement.

15. The pneumatic-spring shock-absorber assembly according to claim 14, wherein:
at least one of said plurality of outer guide webs is substantially longer than the others of said outer guide webs to form a handle for manipulation of said mechanical transport-safety-device.

16. The pneumatic-spring shock-absorber assembly according to claim 15, wherein:
said handle comprises at least one hole to form a retaining eyelet for retaining accessories such as control cables or lines.

17. The pneumatic-spring shock-absorber assembly according to claim 16, wherein:
said bellows first end connecting arrangement comprises an inner suspension tube, said inner suspension tube is connected to said cylinder;
said bellows first end connecting arrangement comprises an arrangement for crimping said bellows first end to said inner suspension tube;
said bellows second end connecting arrangement comprises an outer suspension tube;
said mechanical transport-safety-device is made of a single sheet of packing material having a length to width ratio of two to one;
the inside diameter of said ring-shaped spacer has a center;
the outside diameter of said ring-shaped spacer has a center, the outside diameter of said ring-shaped spacer center is the same as the inside diameter of said ring-shaped spacer center;
the center is substantially centered along the width of said sheet, and the center is disposed substantially one-fourth of the length of said sheet from one edge of said sheet in a direction along the length of said sheet, and the center is disposed substantially three-fourths of the length of said sheet from an edge opposite to said edge in a direction along the length of said sheet;
said opening of said ring-shaped spacer is formed by a cut that extends from the center to said edge that is substantially one-fourth the length of said sheet from the center in a direction along the length of said sheet;
said plurality of inner guide webs is formed by:
a first cut, the first cut is the cut forming the opening of said ring-shaped spacer; and
a plurality of adjacent cuts, the plurality of adjacent cuts are separated by angles of substantially thirty degrees, the adjacent cuts extend along radial lines from the center, the adjacent cuts go to the inside circumference of said ring-shaped spacer but not beyond the inside circumference of said ring-shaped spacer;
a bend between each of said inner guide webs and the inside circumference of said ring-shaped spacer orients said inner guide webs substantially perpendicular to said ring-shaped spacer;
the cuts forming said inner guide webs are substantially one-eighth the length of said sheet in length;
a length of each inner guide web adjacent the inside circumference of said ring-shaped spacer is substantially one-sixteenth the length of said sheet;
said ring-shaped spacer has a width between the inside circumference of said ring-shaped spacer and the outside circumference of said ring-shaped spacer, the ring-shaped spacer width is substantially one-sixteenth the length of said sheet;
said plurality of outer guide webs is formed by:
a first cut, the first cut is the cut forming the opening of said ring-shaped spacer;
four adjacent cuts on each side of the first cut extending radially from the outside circumference of said ring-shaped spacer in a direction away from the center, the four adjacent cuts on each side are along the same radial lines of the inner cuts, each of the four adjacent cuts on each side continue through an edge of said sheet, the four adjacent cuts on each side form four outer guide webs on each side of the first cut; and
an additional adjacent cut substantially parallel to one of each of the four adjacent cuts disposed farthest from the first cut forming the outer guide webs, each of which parallel cuts is from the outside circumference of said ring-shaped spacer to an edge of said sheet, the parallel cuts each form an additional outer guide web, and the parallel cuts separate said handle from others of said outer guide webs;
a bend between each of said outer guide webs and the outside circumference of said ring-shaped spacer orients said outer guide webs substantially perpendicular to said ring-shaped spacer;
a length of each outer guide web along the outside circumference of said ring-shaped spacer is substantially one-tenth the length of said sheet;
lengths of the cuts forming the outer guide webs vary from substantially one-sixteenth the length of said sheet in length to substantially one-sixth the length of said sheet in length, depending on the distance from the outside circumference of said ring-shaped spacer to said edge of said sheet;
said handle extends from the outside circumference of said ring-shaped spacer to said edge of said sheet that is substantially three-fourths the length of said sheet from the center in a direction along the length of said sheet;
said handle comprises four sections, said four sections are formed by:
a first bend substantially along the center of the length of said sheet extending along the length of said sheet, said first bend is substantially thirty degrees from a plane formed by said sheet; and
two additional bends extending along the length of said handle and dividing the width of said sheet into substantially one-fourths, which two bends are each substantially ninety degrees or more; and
a bend between said handle and the outside circumference of said ring-shaped spacer orients said handle substantially perpendicular to said ring-shaped spacer.

18. A method for shipping a pneumatic-spring shock-absorber assembly, wherein the pneumatic-spring shock-absorber assembly for shipping comprises: a cylinder; an arrangement for connecting said cylinder to a first portion of a vehicle; a piston, said piston being slidably mounted inside said cylinder; said piston dividing said cylinder into two working chambers; a piston rod being connected to said piston to move with said piston; an arrangement for connecting said piston rod to a second portion of a vehicle; a pneumatic-spring chamber, said pneumatic spring chamber comprising: an elastic roller bellows, said elastic roller bellows comprising: a first end; a second end; and a portion between said first end and said second end; an arrangement for connecting said bellows first end to the first portion of a vehicle; and an arrangement for connecting said bellows second end to the second portion of a vehicle; said pneumatic-spring chamber comprising an inside surface to contain a gas within said pneumatic-spring chamber; said pneumatic-spring chamber comprising an outside surface, said outside surface being disposed opposite said inside surface; said first end of said elastic roller bellows being movable with respect to said bellows between portion; a mechanical transport-safety-device to limit movement between said first end of said elastic roller bellows and said bellows between portion during shipping, to prevent damage to said bellows; said first end of said elastic roller bellows being movable to make contact with said bellows between portion during shipping, in absence of said mechanical transport-safety-device; said mechanical transport-safety-device to minimize contact between said first end of said elastic roller bellows and said bellows between portion; said mechanical transport-safety-device being removably disposed adjacent to said outside surface of said pneumatic-spring chamber; said mechanical transport-safety-device comprising a mechanical arrangement for occupying a space between said bellows first end connecting arrangement and said bellows second end connecting arrangement; and said mechanical arrangement for occupying a space being removably disposed in the space between said bellows first end connecting arrangement and said bellows second end connecting arrangement; said method comprising the steps of:

providing a cylinder;
providing an arrangement for connecting said cylinder to a first portion of a vehicle;
providing a piston;
providing a piston rod;
providing an arrangement for connecting said piston rod to a second portion of a vehicle;
providing a pneumatic-spring chamber, said pneumatic spring chamber comprising:
an elastic roller bellows, said elastic roller bellows comprising:
a first end;
a second end; and
a portion between said first end and said second end;
an arrangement for connecting said bellows first end to the first portion of a vehicle; and
an arrangement for connecting said bellows second end to the second portion of a vehicle;
said pneumatic-spring chamber comprising an inside surface to contain a gas within said pneumatic-spring chamber;
said pneumatic-spring chamber comprising an outside surface, said outside surface being disposed opposite said inside surface;
said first end of said elastic roller bellows being movable with respect to said bellows between portion;

providing a mechanical transport-safety-device to limit movement between said first end of said elastic roller bellows and said bellows between portion during shipping, to prevent damage to said bellows;
said first end of said elastic roller bellows being movable to make contact with said bellows between portion during shipping, in absence of said mechanical transport-safety-device;
said mechanical transport-safety-device to minimize contact between said first end of said elastic roller bellows and said bellows between portion;
said mechanical transport-safety-device comprising a mechanical arrangement for occupying a space between said bellows first end connecting arrangement and said bellows second end connecting arrangement; and
said method comprising further steps of:
assembling said pneumatic-spring shock-absorber, said step of assembling said pneumatic-spring shock-absorber comprising the steps of:
assembling a shock-absorber, said step of assembling a shock absorber comprising steps of:
connecting said cylinder to said arrangement for connecting said cylinder to a first portion of a vehicle;
inserting said piston into said cylinder to divide said cylinder into two working chambers;
connecting said piston rod to said piston; and
connecting said piston rod to said arrangement for connecting said piston rod to a second portion of a vehicle; and
connecting said pneumatic-spring chamber to said shock-absorber;
removably installing said mechanical transport-safety-device on the assembled pneumatic-spring shock-absorber assembly adjacent to said outside surface of said pneumatic-spring chamber by removably installing said mechanical arrangement for occupying a space between said bellows first end connecting arrangement and said bellows second end connecting arrangement;
packing the pneumatic-spring shock-absorber assembly in a shipping container;
shipping the pneumatic-spring shock-absorber assembly;
unpacking the pneumatic-spring shock-absorber assembly;
installing the pneumatic-spring shock-absorber assembly on a vehicle; and
removing said mechanical transport-safety-device from the pneumatic-spring shock-absorber assembly.

19. The method according to claim 18, wherein:
said mechanical arrangement for occupying a space comprises an arrangement for centering said bellows first end connecting arrangement with respect to said bellows second end connecting arrangement to center said first end of said elastic roller bellows with respect to said bellows between portion;
said arrangement for centering said bellows first end connecting arrangement with respect to said bellows second end connecting arrangement comprises a ring-shaped spacer for at least partly surrounding said bellows first end connecting arrangement;
said ring-shaped spacer comprises an opening to permit expansion of said ring-shaped spacer to install said ring-shaped spacer to at least partly surround said bellows first end connecting arrangement;

said step of removably installing said mechanical transport-safety-device comprises a step of expanding said ring-shaped spacer and disposing said ring-shaped spacer to at least partly surround said bellows first end connecting arrangement;

said ring-shaped spacer has an inside diameter defining an inside circumference of said ring-shaped spacer;

said ring-shaped spacer comprises a plurality of inner guide webs connected to said ring-shaped spacer at the inside circumference of said ring-shaped spacer, said inner guide webs to support said mechanical transport-safety-device on said bellows first end connecting arrangement;

said ring-shaped spacer has an outside diameter defining an outside circumference of said ring-shaped spacer;

said ring-shaped spacer comprises a plurality of outer guide webs connected to said ring-shaped spacer at the outside circumference of said ring-shaped spacer, said outer guide webs to support said bellows second end connecting arrangement;

at least one of said plurality of outer guide webs is substantially longer than the others of said outer guide webs to form a handle for manipulation of said mechanical transport-safety-device;

said handle comprises at least one hole to form a retaining eyelet for retaining accessories such as control cables or lines;

said bellows first end connecting arrangement comprises an inner suspension tube, said inner suspension tube is connected to said cylinder;

said bellows first end connecting arrangement comprises an arrangement for crimping said bellows first end to said inner suspension tube;

said bellows second end connecting arrangement comprises an outer suspension tube;

said mechanical transport-safety-device is made of a single sheet of packing material having a length to width ratio of substantially two to one;

the inside diameter of said ring-shaped spacer has a center;

the outside diameter of said ring-shaped spacer has a center, the outside diameter of said ring-shaped spacer center is the same as the inside diameter of said ring-shaped spacer center;

the center is substantially centered along the width of said sheet, and the center is disposed substantially one-fourth of the length of said sheet from one edge of said sheet in a direction along the length of said sheet, and the center is disposed substantially three-fourths of the length of said sheet from an edge opposite to said edge in a direction along the length of said sheet;

said opening of said ring-shaped spacer is formed by a cut that extends from the center to said edge that is substantially one-fourth the length of said sheet from the center in a direction along the length of said sheet;

said plurality of inner guide webs is formed by:
 a first cut, the first cut is the cut forming the opening of said ring-shaped spacer; and
 a plurality of adjacent cuts, the plurality of cuts are separated by angles of substantially thirty degrees, the adjacent cuts extend along radial lines from the center, the adjacent cuts go to the inside circumference of said ring-shaped spacer but not beyond the inside circumference of said ring-shaped spacer;

a bend between each of said inner guide webs and the inside circumference of said ring-shaped spacer orients said inner guide webs substantially perpendicular to said ring-shaped spacer;

the cuts forming said inner guide webs are substantially one-eighth the length of said sheet in length;

a length of each inner guide web adjacent the inside circumference of said ring-shaped spacer is substantially one-sixteenth the length of said sheet;

said ring-shaped spacer has a width between the inside circumference of said ring-shaped spacer and the outside circumference of said ring-shaped spacer, the ring-shaped spacer width is substantially one-sixteenth the length of said sheet;

said plurality of outer guide webs is formed by:
 a first cut, the first cut is the cut forming the opening of said ring-shaped spacer;
 four adjacent cuts on each side of the first cut extending radially from the outside circumference of said ring-shaped spacer in a direction away from the center, the four adjacent cuts on each side are along the same radial lines of the inner cuts, each of the four adjacent cuts on each side continue through an edge of said sheet, the four adjacent cuts on each side form four outer guide webs on each side of the first cut; and
 an additional adjacent cut substantially parallel to one of each of the four adjacent cuts disposed farthest from the first cut forming the outer guide webs, each of which parallel cuts is from the outside circumference of said ring-shaped spacer to an edge of said sheet, the parallel cuts each form an additional outer guide web, and the parallel cuts separate said handle from others of said outer guide webs;

a bend between each of said outer guide webs and the outside circumference of said ring-shaped spacer orients said outer guide webs substantially perpendicular to said ring-shaped spacer;

a length of each outer guide web along the outside circumference of said ring-shaped spacer is substantially one-tenth the length of said sheet;

lengths of the cuts forming the outer guide webs vary from substantially one-sixteenth the length of said sheet in length to substantially one-sixth the length of said sheet in length, depending on the distance from the outside circumference of said ring-shaped spacer to said edge of said sheet;

said handle extends from the outside circumference of said ring-shaped spacer to said edge of said sheet that is substantially three-fourths the length of said sheet from the center in a direction along the length of said sheet;

said handle comprises four sections, said four sections are formed by:
 a first bend substantially along the center of the length of said sheet extending along the length of said sheet, said first bend is substantially thirty degrees from a plane formed by said sheet; and
 two additional bends extending along the length of said handle and dividing the width of said sheet into substantially one-fourths, which two bends are each substantially ninety degrees or more; and a bend between said handle and the outside circumference of said ring-shaped spacer orients said handle substantially perpendicular to said ring-shaped spacer.

* * * * *